Figure 1:
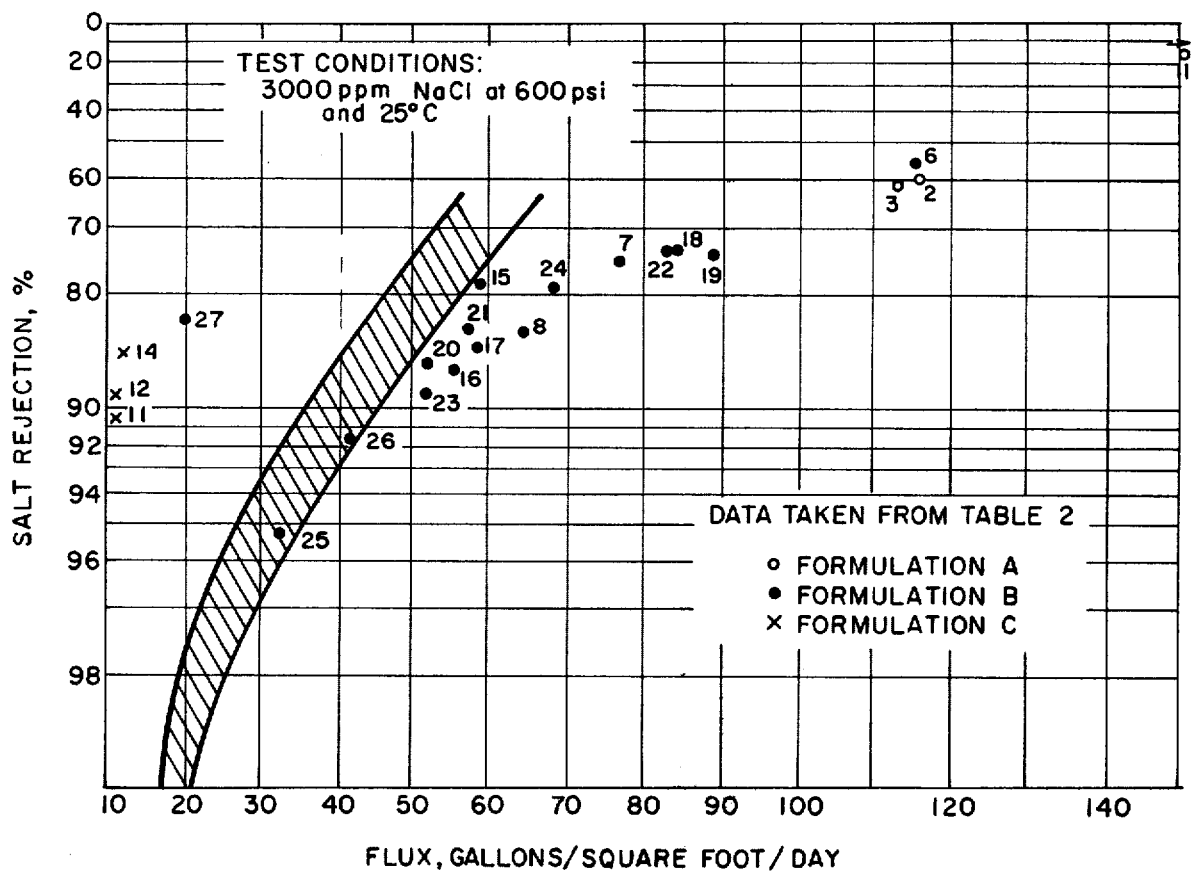

United States Patent [19]

Graefe et al.

[11] 3,875,096

[45] Apr. 1, 1975

[54] PROCESS FOR THE PREPARATION OF A STABLE SALT FORM OF A SULFONATED POLYARYLETHER SULFONE

[75] Inventors: Allen F. Graefe, Claremont; Clarence W. Saltonstall, Jr., West Covina; William J. Schell, Manhattan Beach, all of Calif.

[73] Assignee: The United States of America as represented by the Secretary of the Interior, Washington, D.C.

[22] Filed: Mar. 20, 1974

[21] Appl. No.: 453,140

[52] U.S. Cl... 260/29.2 N, 260/29.2 R, 260/30.4 R, 260/31.8 Z, 260/31.8 G, 260/49, 260/79, 264/41
[51] Int. Cl................................................ C09g 1/04
[58] Field of Search............ 264/41; 260/49, 29.2 R, 260/31.8 Z, 31.8 G, 79, 29.2 N, 30.4 R

[56] References Cited
UNITED STATES PATENTS

| | | | |
|---|---|---|---|
| 3,479,390 | 11/1969 | Blatz et al. | 260/49 |
| 3,567,810 | 3/1971 | Baker | 264/41 |
| 3,691,068 | 9/1972 | Cross | 264/41 |

*Primary Examiner*—Melvyn I. Marquis
*Attorney, Agent, or Firm*—Gersten Sadowsky; William S. Brown

[57] ABSTRACT

A process for the preparation of an alkali metal or ammonium salt of a sulfonated polyarylether sulfone suitable for membrane manufacture which process minimizes degradation of the polymer and comprises sulfonating the polyarylether sulfone at a temperature of less than 5°C, thus producing a precipitate of a sulfonated polyarylether sulfone and a free mineral acid capable of degrading the polymer precipitate, preferably decanting the solvent of the reaction mixture at the same low temperature to effect separation of the free acid from the precipitate sulfonated polymer, thereafter washing the sulfonated polymer with a cold non-solvent liquid which may be, for example, a quantity of the solvent employed in the earlier sulfonation reaction and thus, effect a further removal of mineral acid and thereafter, treating the sulfonated polymer with an excess of a cold aqueous alkali, for example, an alkali metal hydroxide or ammonium hydroxide at a temperature of less than 5°C to produce a stable salt of the sulfonated polyarylether sulfone. In a preferred embodiment the salt of the sulfonated polyarylether sulfone is then comminuted in a non-solvent liquid and held overnight to permit leaching of any occluded acid by excess alkali present.

10 Claims, 1 Drawing Figure

PERFORMANCE DATA FOR POLYSULFONE MEMBRANES V.
CELLULOSE ACETATE BLEND MEMBRANE PERFORMANCE CURVE

PROCESS FOR THE PREPARATION OF A STABLE SALT FORM OF A SULFONATED POLYARYLETHER SULFONE

This invention relates to a process for the preparation of an alkali metal or ammonium salt of a sulfonated polyarylether sulfone, especially suitable for membrane manufacture and which process minimizes degradation of the polymer and thus, provides a product for the preparation of membranes of superior flux and high salt retention.

Cellulose acetate has been commonly employed as a preferred material from which desalination membranes are prepared, because of high water flux and low salt passage characteristics associated with this material. However, under certain operating conditions cellulose acetate suffers the disadvantage of a limited operating lifetime, largely because of its chemical reactivity. For example, such membranes are susceptible to hydrolysis at very high or low pH levels, degradation by microorganisms and attack by active chlorine in water.

Recently, there has been advanced a non-cellulose polymer for membrane fabrication that exhibits intrinsic chemical and reverse osmosis transport properties which are favorably compared to those of cellulose acetate. This new polymer is based on an aromatic poly(ether-sulfone) condensation material having a backbone chain of the formula

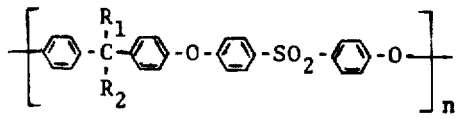

in which $R_1$ and $R_2$ are hydrogen, alkyl or aryl radicals. The polymers are characterized by excellent thermal stability and chemical inertness. When $R_1$ and $R_2$ are both methyl groups the polymers are commercially available products with values of n typically between about 50 and 80. They are clear, rigid, tough thermoplastics with high glass transition temperatures (180° to 250°C), but are too hydrophobic to exhibit useful hydraulic permeabilities. However, such polymers can be made hydrophilic through direct sulfonation, as shown in Reaction 1 below, and are then of interest in desalination applications.

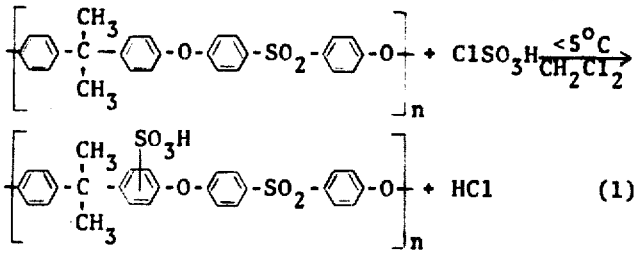

(1)

Reaction 1 leads to the acid form of the sulfonated polymer, and this form can be utilized for preparing desalination membranes. However, it has been found that the acid form is unstable in the presence of mineral acids that are necessarily present during the synthesis of the sulfonated product (see Reaction 1), and as a result partial degradation of the polymer backbone (depolymerization) tends to occur before the desired higher molecular weight sulfonated product can be isolated. It has been shown that even with the removal of the mineral acid, HCl and $H_2SO_4$ from the presence of the sulfonated polymer of Reaction 1, that the acid form of the polymer provided by the Reaction 1 is less stable than the corresponding alkali metal salt form of Reaction 2 below.

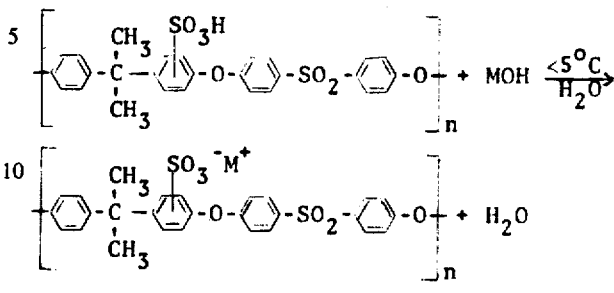

where M = $NH_4$, Li, Na, or K    (2)

It has been found that the polymer salt of Reaction 2 can be fabricated into a more useful asymmetric membrane and a membrane of superior desalination properties than membranes prepared from the acid form of the polymer of Reaction 1.

In the present invention, degradation of the product of Reaction 1 is prevented by (1) decanting the methylene chloride solvent from the reaction mixture after the sulfonated product has precipitated from solution, followed by washing the product with fresh cold methylene chloride; and (2) subsequent treatment of the cold sulfonated polymer with excess cold aqueous alkali to effect Reaction 2. The solvent decantation step serves to remove dissolved HCl and any unreacted $ClSO_3H$ that would otherwise cause partial degradation of the product on subsequent warming to room temperature. The treatment with excess alkali effectively transforms the sulfonated product into a stable salt form, thus preventing any subsequent self-degradation of the polymer that might otherwise occur due to the inherent presence of the strongly acidic sulfonic acid group. The use of alkali is also effective in neutralizing any mineral acid occluded by the polymer, and consequently not removed during the earlier solvent decantation and washing; for example:

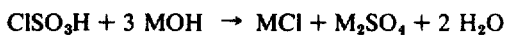

(3)

The salt form of the polymer produced with the foregoing precautions of low temperature and prompt removal of extraneous acid from the sulfonated polymer product, yields dense films and asymmetric membranes with superior reverse osmosis properties. The salt forms can also be utilized in the preparation of composite membranes, in which a thin film of the polymer is overlaid on a porous support.

In the preparation of the alkali metal or ammonium salt of the sulfonated polyarylether sulfone of the invention it has been found desirable to conduct the succeeding processing steps at temperatures less than 5°C and promptly separate the mineral acid as well as unreacted chlorosulfonic acid of Reaction 1 from the sulfonated polyarylether sulfone precipitate, this being achieved by decanting the liquid from the reaction mixture at a low temperature not to exceed room temperature. Thereafter, the sulfonated precipitant is washed one or more times with a cold non-solvent liquid (having a temperature of less than 5°C) to effect a further removal of acid including any residual chlorosulfonic acid or other sulfonation reagent. Various cold liquids, for example, the sulfonation-inert solvent employed in the sulfonation of the polyarylether sulfone may be utilized as the wash liquid.

The solid polymer product either in its acid form or preferably, its salt form may be comminuted in a wash liquid to expose occluded acid, held overnight, thus facilitating the separation of the acid from the polymer product.

Various sulfonation reagents are available for the Reaction 1 including chlorosulfonic acid, sulfuric acid, oleum, and other known sulfonation materials.

The available sulfonation-inert solvents for use in the sulfonating step include methylene chloride 1,2-dichloroethane, chloroform and like solvents.

The sulfonating material is employed in varying amounts to impart the desired degree of hydrophilicity and is typically employed in amounts such that the ratio of the number of sulfur atoms of the sulfonating agent to the number of the sulfur atoms of the fulfone groups of the polymer is between about 0.3:1 and 6:1, and preferably between 0.5:1 and 2:1.

The single drawing presents performance data for the sulfonated polyarylether sulfone membrane of the invention compared with performance data of a conventional and popular cellulose acetate blend membrane.

The following examples illustrate the major embodiments of the present invention with respect to the synthesis of preferred forms of the sulfonated polymer via Reactions 1 and 2, the preparation of and reverse osmosis testing of dense polymer films, and the subsequent fabrication and reverse osmosis testing of asymmetric membranes.

EXAMPLE 1 - SYNTHESIS

Into a three-necked, 5-liter reaction flask, fitted with a mechanical stirrer, a 1-liter dropping funnel, and a thermometer was placed 2600 ml of $CH_2Cl_2$ (0.006% $H_2O$) and 106.1 g of Bakelite polysulfone-1700 ($C_{27}H_{22}SO_4$, from Union Carbide). The Bakelite polysulfone-1700 is a poly(ethersulfone) of the general structural formula employed in the sulfonation of Reaction 1. The mixture was stirred at room temperature until all of the polymer had dissolved, and the solution was then cooled to <5°C with an external ice-water bath. To the cooled and well-stirred solution was added dropwise a solution of 28.0 g (15.6 ml = 0.24 moles = the stoichiometric amount in accordance with Reaction 1) of $ClSO_3H$ in 1,000 ml of $CH_2Cl_2$ (0.006% $H_2O$) over a period of 1 hour. The temperature of the reaction mixture did not rise above 5°C during this time. After the addition the mixture was stirred for an additional 3 hours at <5°C to complete the reaction. In some runs the reaction mixture was instead allowed to warm to about 17°C over a 2 hour period to complete the reaction. The solvent was then decanted from the purple solid that had formed during the reaction, and the solid was subsequently washed with three 250 ml portions of fresh-cooled $CH_2Cl_2$ (at a temperature of less than 5°C). After decantation of the last portion of the $CH_2Cl_2$ 3 liters of cold (−10°C) aqueous 0.25 N NaOH was added to the flask in one portion, and the mixture was stirred at <5°C for 1 hour. During this time the purple solid turned white, except for that portion which had become embedded against the flask walls, and which had therefore not been adequately exposed to the caustic solution. Stirring was discontinued at this point, and the walls of the flask were mechanically scraped to dislodge the solid. The mixture was then stirred for an additional hour, and at the end of this period the solid was completely white. The entire contents of the flask was transferred to a one gallon Waring Blendor, and blended for three minutes. The cold finely divided suspension, which was still basic, was stored in a refrigerator overnight to permit the leaching of any occluded acid by the excess base present.

The solution was filtered through a coarse fritted glass disc and the solid, which was now permitted to warm to room temperature, was washed with water until the filtrate was no longer basic, followed by an additional six washings. At this point water was again added to the solid, the suspension again blended for three minutes, and the suspension permitted to stand overnight to promote the leaching of any occluded salt (see Reaction 3).

The solution was filtered, and the solid washed six additional times with water. The solid was then air-dried for several days, and was subsequently dried in vacuo at room temperature to a constant weight of 112.2 g. Subsequent analyses of the product for sodium indicated that 48 percent of the $ClSO_3H$ used had reacted in accordance with Reaction 1. The remainder was presumably rendered unavailable for reaction as a result of the precipitation of the partially sulfonated product.

The above procedure was also used for the preparation of the potassium, lithium and ammonium forms of the polymer, through the direct substitution of the appropriate base for the NaOH employed in the example.

EXAMPLE 2 - DENSE FILM DATA

Dense film data relating to various sulfonated products are presented in Table 1. In all cases 10 percent solutions of the various salt forms of the sulfonated polymer in dimethylformamide were separately cast on glass plates at a thickness of 10 mils, and allowed to dry to dense films at zero percent relative humidity. Drying was completed at 60°C, and after cooling the films were released from the plates under water. The resulting extremely tough films were cut into 3-inch circles for reverse osmosis testing.

When a moderate excess of chlorosulfonic acid was used in Reaction 1 ($ClSO_3H$/polymer = 1.25) a dense film of the product exhibited a marked increase in the value of $D_1C_1$ (water permeability), as shown by a comparison of Runs 1 and 2 in Table 1 ($20.0 \times 10^{-7}$ gcm$^{-1}$ sec$^{-1}$ vs $3.2 \times 10^{-7}$ gcm$^{-1}$ sec$^{-1}$ for simulated seawater). However, the ammonium form of the sulfonated product tended to become soluble in the excess ammonia used for workup when a relatively large excess of acid was used ($ClSO_3H$/polymer≈2). With a moderate deficiency of acid ($ClSO_3H$/polymer = 0.75) a dense film of the product exhibited a very low value of $D_1C_1$, as shown for Run 3 in Table 1 ($0.37 \times 10^{-7}$ gcm$^{-1}$ sec$^{-1}$ for simulated seawater).

In contrast to the reduced flux normally encountered following the heat-treatment of cellulose acetate films and membranes, heat-treatment of films and membranes derived from sulfonated polysulfone increases the flux, although to only a limited extent. This can be seen in the case of films by comparing Runs 5 and 6, and it will be shown in Example 3 below, that this phenomenon also applies to asymmetric membranes.

From the data in Table 1 it is apparent that the various sulfonated polymers of interest offer excellent flux and salt rejection characteristics. In particular, unusually high fluxes and $D_1C_1$ values were observed in many instances with concomitant high salt rejections. Values for $D_1C_1/D_2K$ (water permeability/salt permeability) are significantly higher than those normally associated with cellulose acetate dense films, indicating that salt rejection for asymmetric membranes made from these polymers should be superior to those obtained with cellulose acetate membranes at the same flux. It will be noted from the table that high salt rejection was observed under simulated seawater conditions, but only if the films were relatively dense. For example, in both Runs 1 and 7 the observed rejection of sodium chloride was 99.4 percent, but in Runs 2 and 4 the films were somewhat porous as indicated by high fluxes, and the rejection was correspondingly reduced. The intrinsic ability of sulfonated polysulfone to reject ionic solutes is dramatically shown in Run 7, in which sodium sulfate, sodium chloride, and calcium chloride were all highly rejected from relatively concentrated solutions. The overall data of Table 1 indicate the potential of utilizing sulfonated polysulfone for seawater desalination, but suggest that the active layer in prepared asymmetric membranes is desirably highly dense.

EXAMPLE 3 - ASYMMETRIC MEMBRANE DATA

Asymmetric membrane data relating to various sulfonated products are presented in Table 2. Test conditions were selected for this study (600 psi and 3,000 ppm of salt) that would allow direct comparison with data previously obtained for cellulose acetate of moderate salt rejection as discussed in the next paragraph. All of the membranes were machine-cast at 10 mils thickness and 5-inch width onto a moving belt of either silicone-coated paper or aluminized Mylar, and were normally gelled in 4.7 percent sodium chloride at 1°C. In general the paper castings were inferior to the Mylar castings. The latter yielded uniform and usually slightly translucent or opaque membranes, whereas the paper castings were often blotched and usually contained pinholes that had to be taped before the membranes were tested in 3-inch diameter test cells.

From the data in Table 2 it is seen that with sodium sulfate feed both a high flux (up to about 40 gallons per square foot per day (gfd)) and high rejection (up to about 99.7 percent) were observed for the sodium form of the sulfonated polymer under the experimental conditions employed (see, for example, Runs 25 and 26). Moreover, with a sodium chloride feed the observed reverse osmosis properties compared very favorably with those exhibited by cellulose acetate blend membrane. This is shown in FIG. 1, which includes all of the data presented in Table 2 relating to the use of a sodium chloride feed, as well as a broad performance curve for a standard production blend membrane (cellulose acetate-cellulose triacetate, as generally described in U.S. Pat. No. 3,497,072, Cannon), as obtained under the same testing conditions (3,000 ppm NaCl at 600 psi). The latter curve (shaded area) represents an accumulation of data obtained from the testing of twenty 800-foot rolls of membrane. Approximately 90 percent of the accumulated cellulose acetate blend test data fell within the shaded area shown in FIG. 1.

It will be noted in comparing the data in Table 2 with the plotted points in FIG. 1 that regardless of which salt form of the polymer was used, and the heat-treatment temperature, etc., the points representing formulations A and B in general lie to the right of the cellulose acetate-cellulose triacetate blend membrane shaded curve. It is evident, therefore, that these formulations have resulted in the fabrication of membranes that exhibit reverse osmosis properties that are superior to those of the cellulose acetate blend. In particular formulation A gave rise to very high fluxes. On the other hand membranes drived from formulation C exhibited properties inferior to those of the blend membrane, and attests to the importance of formulation in this work. Data for the acid form of the polymer have not been included in either Table 2 or FIG. 1 because they were obtained under slightly different experimental conditions. However, it was observed that the reverse osmosis properties of asymmetric membranes derived from this form were inferior to those shown in the table and figure for the salt forms. For example, the best results obtained for asymmetric membranes prepared from the acid form via formulation B are shown below (aqueous NaCl feed at 600 psi and at a flow rate of 6.3 gph):

| Membrane | Feed, ppm | Flux, gfd | Salt Rej. % |
|---|---|---|---|
| 1 | 1000 | 41.0 | 80.7 |
| 1 | 5000 | 34.0 | 83.1 |
| 2 | 1000 | 68.5 | 62.3 |
| 2 | 5000 | 72.5 | 55.3 |

An investigation of the composition of the casting solution suitable for the preparation of a membrane from the alkali metal or ammonium salt of the sulfonated polyarylether sulfone has shown that the polymer, primarily for viscosity reasons, should not exceed 45 percent by weight of the total casting solution and in order to prepare an adequate membrane-forming solution, the polymer should comprise at least 15 percent by weight of the solution. The swelling agent is preferably a di- or tri-basic acid having from 2 to 13 carbon atoms with the swelling agent being present in an amount of 0.5–10 parts by weight per 10 parts of the polymer. Either water or other low-molecular-weight, hydroxyl-containing liquid, such as, glycerine or ethylene glycol is an essential component of the casting solution and is necessarily present in 2.5 to 10 parts by weight per 10 parts of the polymer. The water or other hydroxyl-containing liquid desirably makes up 5–20 percent of the organic solvent-water fraction of casting solution. A preferred organic solvent comprises a mixture of dioxane and acetone with the dioxane being the dominant component of the solvent and with the acetone being present in an amount from 0 to 35 percent of the solvent-water (or other hydroxyl-containing liquid) fraction. The preferred acid swelling agent is maleic acid.

TABLE 1

DESALINATION PROPERTIES OF SULFONATED POLYSULFONES DENSE FILMS (Films cast at 10 mils on glass plates from 10% DMF solution at 0% relative humidity, dried overnight at room temperature, and then warmed at 60°C for one hour.)

| Run No.[a,b] | Form of Polymer | Thickness, mils | Feed | Pressure, psig | Hours tested, $\Sigma$ | Flux, gfd | Salt Rejection, % | $D_1C_1$ $gcm^{-1}sec^{-1}$ $\times 10^7$ | $D_2K$ $cm^2sec^{-1}$ $\times 10^{10}$ | $D_1C_1/D_2K$ $gcm^{-3}$ |
|---|---|---|---|---|---|---|---|---|---|---|
| 1 | Ammonium | 0.37 | 1000 ppm NaCl | 800 | 26 | 0.22 | 99.2 | 2.7 | 0.87 | 3140 |
|  |  |  | 35000 ppm NaCl | 1500 | 47 | 0.38 | 99.4 | 3.2 | 1.06 | 3000 |
| 2[c] |  | 0.42 | 1000 ppm NaCl | 800 | 25 | 1.33 | 99.2 | 18.6 | 6.2 | 3020 |
|  |  |  | 35000 ppm NaCl | 1500 | 29 | 2.07 | 94.9 | 20.0 | 62.5 | 321 |
| 3[d] |  | 0.16 | 1000 ppm NaCl | 800 | 121 | 0.08 | 97.8 | 0.41 | 0.36 | 1151 |
|  |  |  | 35000 ppm NaCl | 1500 | 142 | 0.10 | 98.2 | 0.37 | 0.37 | 996 |
| 4[e] | Lithium | 0.31 | 1000 ppm NaCl | 800 | 42 | 0.78 | 99.4 | 7.89 | 2.12 | 3725 |
|  |  |  | 35000 ppm NaCl | 1500 | 66 | 1.26 | 96.6 | 9.30 | 17.61 | 528 |
|  |  |  | 3000 ppm Na$_2$SO$_4$ | 800 | 139 | 0.86 | 99.8 | 8.81 | 0.64 | 13708 |
| 5 | Sodium | 0.45 | 1000 ppm NaCl | 800 | 42 | 0.37 | 99.4 | 5.42 | 1.28 | 4237 |
|  |  |  | 35000 ppm NaCl | 1500 | 66 | 0.58 | 98.6 | 6.24 | 5.01 | 1245 |
|  |  |  | 3000 ppm Na$_2$SO$_4$ | 800 | 139 | 0.39 | 99.7 | 5.88 | 0.65 | 9000 |
| 6[f] |  | 0.41 | 1000 ppm NaCl | 800 | 24 | 0.50 | 99.0 | 6.79 | 2.49 | 2730 |
| 7[g] |  | 0.27 | 35000 ppm Na$_2$SO$_4$ | 1500 | 99 | 0.84 | >99.9 | 4.52 | - | - |
|  |  |  | 35000 ppm NaCl | 1500 | 169 | 0.64 | 99.4 | 4.12 | 1.50 | 2742 |
|  |  |  | 35000 ppm CaCl$_2$ | 1500 | 194 | 0.50 | 99.5 | 2.84 | 0.91 | 3122 |

[a] In prepartion of sulfonated product ClSO$_3$H/polysulfone = 1, and reaction conducted at <5°C with subsequent warming of reaction mixture to about 17°C before addition of base, unless otherwise noted.
[b] Three circles tested unless otherwise noted.
[c] ClSO$_3$H/polysulfone = 1.25.
[d] ClSO$_3$H/polysulfone = 0.75.
[e] Two circles tested.
[f] Heat-treated in water at 90°C for 30 minutes.
[g] No warming of reaction mixture before addition of base (compare note a, above)

TABLE 2

DESALINATION PROPERTIES OF SULFONATED POLYSULFONE MEMBRANES (Membranes machine-cast at 10 mils in 4.7% NaCl at 1°C, and tested at 600 psi with 3000 ppm of salt)

| Run No.[a] | Polymer Form[b] | Formulation[c] | Backing[d] | Thickness, mils | Water Content, % | Heat Treatment, °C | Salt | Flow Rate, gph | Hour Tested, $\Sigma$ | Flux, gfd | Salt Rejection, % |
|---|---|---|---|---|---|---|---|---|---|---|---|
| 1 | NH$_4^+$ | A | P | - | 72.2 | 85 | NaCl | 6.3 | 1 | 274.0 | 16.6 |
| 2 |  |  |  | - | 72.3 | 75 | NaCl | 11.1 | 23 | 116.0 | 60.2 |
|  |  |  |  | - | 72.3 | 75 | Na$_2$SO$_4$ | 11.1 | 94 | 49.0 | 94.7 |
| 3 |  |  |  | - | 72.2 | 65 | NaCl | 11.1 | 21 | 113.3 | 58.5 |
|  |  |  |  | - | 72.2 | 65 | Na$_2$SO$_4$ | 11.1 | 66 | 54.0 | 94.7 |
| 4 |  |  |  | 7.0 | 74.3 | None | - | - | - | - | - |
| 5[e] |  |  |  | 9.3 | 83.2 | None | - | - | - | - | - |
| 6 |  | B |  | - | 72.0 | 85 | NaCl | 6.3 | 1 | 115.5 | 55.9 |
| 7 |  |  |  | - | 72.2 | 75 | NaCl | 11.1 | 23 | 77.0 | 75.6 |
|  |  |  |  | - | 72.2 | 75 | Na$_2$SO$_4$ | 11.1 | 94 | 27.7 | 97.7 |
| 8 |  |  |  | - | 72.2 | 65 | NaCl | 11.1 | 21 | 64.7 | 83.8 |
|  |  |  |  | - | 72.2 | 65 | Na$_2$SO$_4$ | 11.1 | 66 | 32.0 | 98.7 |
| 9 |  |  |  | 8.0 | 73.6 | None | - | - | - | - | - |
| 10[e] |  |  |  | 9.8 | 80.8 | None | - | - | - | - | - |
| 11[f] |  | C |  | - | 71.1 | 75 | NaCl | 6.3 | 42 | 11.1 | 90.7 |
|  |  |  |  | - | 71.1 | 75 | Na$_2$SO$_4$ | 6.3 | 47 | 14.3 | 92.7 |
| 12[f] |  |  |  | - | 72.5 | 65 | NaCl | 6.3 | 42 | 10.9 | 89.1 |
|  |  |  |  | - | 72.5 | 65 | Na$_2$SO$_4$ | 6.3 | 47 | 11.3 | 99.0 |
| 13 |  |  |  | 7.8 | 72.8 | None | - | - | - | - | - |
| 14[e] |  |  |  | 9.8 | 84.1 | None | NaCl | 6.3 | 4 | 12.0 | 85.9 |
| 15[g] |  | B |  | - | - | None | NaCl | 10.8 | 22 | 58.8 | 78.5 |
| 16 |  |  |  | 6.2 | 73.8 | 55 | NaCl | 11.1 | 23 | 55.3 | 87.4 |
| 17 |  |  |  | 6.4 | 72.7 | 65 | NaCl | 11.1 | 23 | 58.7 | 85.5 |
| 18 |  |  | M | 7.7 | 75.5 | None | NaCl | 11.1 | 24 | 84.0 | 74.1 |
| 19 |  |  |  | 8.0 | 75.6 | 65 | NaCl | 11.1 | 24 | 89.0 | 74.4 |
| 20 |  | B |  | 8.0 | 75.2 | 65[h] | NaCl | 10.8 | 22 | 52.0 | 86.9 |

(continued)

TABLE 2 (continued)

| Run No.[a] | Polymer Form[b] | Formulation[c] | Backing[d] | Thickness, mils | Water Content, % | Heat Treatment, °C | Salt | Flow Rate, gph | Hour Tested, Σ | Flux, gfd | Salt Rejection, % |
|---|---|---|---|---|---|---|---|---|---|---|---|
| 21 | NA⁺ | B | P | - | - | None | NaCl | 10.8 | 19 | 57.6 | 83.9 |
|  |  |  |  | - | - | None | Na₂SO₄ | 10.8 | 25 | 37.7 | 99.3 |
| 22 |  |  |  | - | - | 85 | NaCl | 10.8 | 19 | 81.3 | 74.1 |
|  |  |  |  | - | - | 85 | Na₂SO₄ | 10.8 | 25 | 58.7 | 98.6 |
| 23 |  |  | M | - | - | None | NaCl | 10.8 | 23 | 52.0 | 88.2 |
| 24 |  |  |  | - | - | 85 | NaCl | 10.8 | 23 | 68.0 | 79.4 |
| 25[g] |  |  | P | 7.4 | - | None | None | 6.3 | 1 | 51.7 | - |
|  |  |  |  | - | - | None | None | 6.3 | 43 | 35.8 | - |
|  |  |  |  | - | - | None | None | 6.3 | 48 | 33.0 | - |
|  |  |  |  | - | - | None | NaCl | 10.8 | 49 | 31.1 | 95.1 |
|  |  |  |  | - | - | None | NaCl | 10.8 | 67 | 32.5 | 95.3 |
|  |  |  |  | - | - | None | Na₂SO₄ | 10.8 | 74 | 32.5 | 99.8 |
|  |  |  |  | 4.7 | - | None | Na₂SO₄ | 10.8 | 139 | 28.1 | 99.7 |
| 26 |  |  |  | 7.2 | - | 85 | None | 6.3 | 1 | 83.9 | - |
|  |  |  |  | - | - | 85 | None | 6.3 | 43 | 44.8 | - |
|  |  |  |  | - | - | 85 | None | 6.3 | 48 | 44.8 | - |
|  |  |  |  | - | - | 85 | NaCl | 10.8 | 49 | 40.3 | 90.9 |
|  |  |  |  | - | - | 85 | NaCl | 10.8 | 67 | 41.6 | 91.6 |
|  |  |  |  | - | - | 85 | Na₂SO₄ | 10.8 | 74 | 40.9 | 99.7 |
|  |  |  |  | 5.1 | - | 85 | Na₂SO₄ | 10.8 | 139 | 36.8 | 99.6 |
| 27[i] |  |  | M | 7.8 | - | None | None | 6.3 | 24 | 46.3 | - |
| 27 |  |  |  | 4.0 | - | None | NaCl | 10.8 | 43 | 19.5 | 82.7 |

[a] Three circles tested unless otherwise noted.
[b] All sulfonated polymers prepared from stoichiometric amounts of reactants, based on Reaction 1.
[c] Based on one gram of polymer formulation A contained 2 g tetrahydrofuran, 0.5 g maleic acid, and 0.5 g water; formulation B contained 2 g dioxane, 0.57 g acetone, 0.11 g maleic acid, and 0.29 g water; and formulation C contained 1.6 g dioxane, 0.79 g acetone, 0.26 g 2-methoxyethanol, and 0.26 g water.
[d] P denotes siliconized paper and M aluminized Mylar.
[e] Gelled in water at 1°C.
[f] Gelled in 4.8% Epsom salts at 1°C.
[g] Two circles tested.
[h] In 10% NaCl.
[i] Pressurized at 1500 psi.

What is claimed is:

1. An improved process for the preparation of an alkali metal or ammonium salt of a sulfonated polyarylether sulfone suitable for membrane manufacture, said process minimizing degradation of the polymer and comprising:
   sulfonating a polyarylether sulfone in a sulfonation inert solvent with a sulfonation reagent at a temperature of less than 5°C, the amount of sulfonation reagent being such that the ratio of the number of sulfur atoms of the sulfonating agent to the number of sulfur atoms of the sulfone is between about 0.3:1 and 6:1, and producing a precipitate of a sulfonated polyarylether sulfone and a free acid;
   decanting the solvent from the reaction mixture to accomplish separation of acid and precipitate;
   washing the sulfonated polymer precipitate with a cold nonsolvent liquid at a temperature of less than 5°C to effect a further removal of acid; and
   thereafter, treating the sulfonated precipitate with an excess of a cold aqueous alkali selected from an alkali metal hydroxide or ammonium hydroxide at a temperature of less than 5°C to produce a stable salt of the sulfonated polyarylether sulfone.

2. A process in accordance with claim 1 wherein the sulfonation reagent is chlorosulfonic acid and hydrogen chloride is produced as the free acid.

3. A process in accordance with claim 1 wherein the sulfonation-inert solvent is methylene chloride.

4. A process in accordance with claim 1 wherein washing of the sulfonated precipitate is accomplished with cold methylene chloride.

5. A process in accordance with claim 1 wherein the salt of the sulfonated polyarylether sulfone produced with the sold aqueous alkali treatment is comminuted in a cold inert liquid and held to permit leaching of occluded acid by excess alkali present.

6. A membrane prepared from the product of the process of claim 1.

7. A casting solution for the preparation of a sulfonated polyarylether sulfone membrane comprising an alkali metal or ammonium salt of a sulfonated polyarylether sulfone polymer with said polymer being present in an amount within the range of 15–45 percent by weight of the casting solution, an organic solvent for the polymer, a di- or tri-basic aliphatic acid swelling agent having from 2 to 13 carbon atoms and being present in an amount of 0.5 to 10 parts by weight per 10 parts of the polymer, a low-molecular-weight, hydroxyl-containing liquid present in the amount of 2.5 to 10 parts by weight per 10 parts of the polymer with the hydroxyl-containing liquid making up 5–20 percent of the combined solvent-water fraction of the casting solution.

8. A casting solution in accordance with claim 7 wherein the swelling agent is maleic acid.

9. A casting solution in accordance with claim 7 wherein the hydroxyl-containing liquid is water.

10. A casting solution in accordance with claim 7 wherein the solvent is primarily dioxane.

* * * * *